(12) United States Patent
Bangalore et al.

(10) Patent No.: US 8,161,057 B2
(45) Date of Patent: *Apr. 17, 2012

(54) METHOD AND APPARATUS FOR DETECTING AND EXTRACTING INFORMATION FROM DYNAMICALLY GENERATED WEB PAGES

(75) Inventors: Srinivas Bangalore, Morristown, NJ (US); Junlan Feng, Basking Ridge, NJ (US); Mazin Gilbert, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,931

(22) Filed: Jan. 17, 2011

(65) Prior Publication Data

US 2011/0184973 A1 Jul. 28, 2011

Related U.S. Application Data

(63) Continuation of application No. 11/546,967, filed on Oct. 12, 2006, now Pat. No. 7,877,396.

(51) Int. Cl.
*G06F 17/30* (2006.01)
(52) U.S. Cl. .......................... 707/755; 707/759
(58) Field of Classification Search .................. None
See application file for complete search history.

(56) References Cited

U.S. PATENT DOCUMENTS

| | | | |
|---|---|---|---|
| 6,721,736 B1 * | 4/2004 | Krug et al. ............ | 707/634 |
| 7,240,045 B1 | 7/2007 | Bushee | |
| 7,505,984 B1 | 3/2009 | Nevill-Manning et al. | |
| 7,877,396 B1 | 1/2011 | Bangalore et al. | |
| 2005/0097160 A1 | 5/2005 | Stob | |
| 2006/0155726 A1 * | 7/2006 | Krasun et al. ............ | 707/100 |
| 2006/0253454 A1 | 11/2006 | Coppola et al. | |
| 2007/0157129 A1 * | 7/2007 | Facemire et al. ............ | 715/968 |
| 2007/0288589 A1 | 12/2007 | Chen et al. | |
| 2008/0071829 A1 | 3/2008 | Monsarrat | |

* cited by examiner

Primary Examiner — Cheyne Ly (57) ABSTRACT

A method and apparatus for automatically detecting and extracting information from dynamically generated web pages are disclosed. For example, the present method stores user provided information that is entered into a form interface of a web page for a first query. Responsive to the first query, a first response web page is received and stored. The present method then automatically generates a second query to acquire a second response web page that is responsive to the second query. Finally, the present method compares the first response web page and the second response web page. In one embodiment, the present invention extracts information that is dissimilar between the first response web page and the second response web page. This extracted information is deemed to be the pertinent information requested by the user.

20 Claims, 5 Drawing Sheets

FIG. 1

|  | 210 | 220 | 230 |
|---|---|---|---|
| | Find an ABC Tee Store | Search results | Create an account or Sign in |
| | We have found several ABC Tee stores near 07733. Please see the results below | Hoboken Store (9)<br>731 Route 9 N<br>Hoboken, NJ | You cart contains<br>0 items<br>Total $0.00 |
| | Modify your search | Map & directions | |
| | | Add to Preferred Stores | |
| | Enter * required fields. Note that you may enter a zipcode | Hoboken Store (10)<br>549 Washington Avenue<br>Hoboken, NJ | Call customer care at 1-888-customer care |
| | [     ] *zipcode | Map & directions | |
| | AND/OR | Add to Preferred Stores | |
| | [     ] Street Address | Jersey City Store (11) | How do we at |
| | [     ] *City | 627 Route 9 N | ABC Tee |
| | [     ] State | Jersey City, NJ | secure your info |
| | | Map & directions | |
| | Preferred Stores | Add to Preferred Stores | |
| | Add up to three stores to your preferred account. If you have already signed up for a preferred account, sign in here. If you would like to know what a preferred account is, click here. To sign up for a preferred account please take a few moments to fill out the some information here. | | Customer satisfaction rating Please take the time to fill out a customer satisfaction rating |

FIG. 2

| | 310 | 320 | 330 |
|---|---|---|---|
| | Find an ABC Tee Store | Search results | Create an account or Sign in |
| | We have found several ABC Tee stores near 07747. Please see the results below | Matawan Store (26) 1156 Route 34 N Matawan, NJ | You cart contains 0 items Total $0.00 |
| | Modify your search | Map & directions | |
| | | Add to Preferred Stores | |
| | Enter * required fields. Note that you may enter a zipcode | Aberdeen Store (27) 129 Lloyd Road Aberdeen, NJ | Call customer care at 1-888-customer care |
| | [     ] *zipcode | Map & directions | |
| | AND/OR | Add to Preferred Stores | |
| | [     ] Street Address | Cliffware Beach Store (28) | How do we at |
| | [     ] *City | 347 Route 9 N | ABC Tee |
| | [     ] State | Cliffware Beach, NJ | secure your info |
| | | Map & directions | |
| | Preferred Stores | Add to Preferred Stores | |
| | Add up to three stores to your preferred account. If you have already signed up for a preferred account, sign in here. If you would like to know what a preferred account is, click here. To sign up for a preferred account please take a few moments to fill out the some information here. | | Customer satisfaction rating Please take the time to fill out a customer satisfaction rating |

FIG. 5

METHOD AND APPARATUS FOR DETECTING AND EXTRACTING INFORMATION FROM DYNAMICALLY GENERATED WEB PAGES

This application is a continuation of the U.S. patent application Ser. No. 11/546,967, filed on Oct. 12, 2006 now U.S. Pat. No. 7,877,396, which is currently allowed and is incorporated herein by reference in its entirety.

The present invention relates generally to information gathering in communication networks and, more particularly, to a method for automatically detecting and extracting information from dynamically generated web pages.

BACKGROUND OF THE INVENTION

Websites can be deployed in two ways: static and dynamic. Static pages provide information to the user but do not accept information from the user, whereas dynamic pages have an interface to a user such as a form to accept information from the user and can respond to requests made by the user. Currently, network service providers and enterprise network operators provide connectivity but do not have the ability to assist the user in terms of detecting and extracting the essential data that a user may be interested in. For example, a user may locate the website of a business that has a particular product using a search engine. The search engine explores the Internet and collects all the static pages that match the search criteria. Upon locating the target website, the user then requests the location of the closest store by entering a zip code on a form. The dynamic web page responds to the user with the store location but also bombards the user with a lot of excess information including advertisements and other menus that the user does not need. The user then has to sort through the web page's response to find the pertinent information. This process is time consuming and often annoying to users.

Websites can be deployed in two ways: static and dynamic. Static pages provide information to the user but do not accept information from the user, whereas dynamic pages have an interface to a user such as a form to accept information from the user and can respond to requests made by the user. Currently, network service providers and enterprise network operators provide connectivity but do not have the ability to assist the user in terms of detecting and extracting the essential data that a user may be interested. For example, a user may locate the website of a business that has a particular product using a search engine. The search engine explores the internet and collects all the static pages that match the search criteria. Upon locating the target website, the user then requests the location of the closest store by entering a zip code on a form. The dynamic web page responds to the user with the store location but also bombards the user with a lot of excess information including advertisements and other menus that the user does not need. The user then has to sort through the web page's response to find the pertinent information. This process is time consuming and often annoying to users.

Consequently, a need exists for a method and apparatus for detecting and extracting information from a dynamically generated website.

SUMMARY OF THE INVENTION

In one embodiment, the present invention discloses a method and apparatus for automatically detecting and extracting information from dynamically generated web pages. For example, the present method stores user entered information that is entered into a form interface of a web page for a first query. Responsive to the first query, a first response web page that is received and stored. The present method then automatically generates a second query (e.g., using default information) to acquire a second response web page that is responsive to the second query. Finally, the present invention compares the first response web page and the second response web page. In one embodiment, the present invention extracts information that is dissimilar between the first response web page and the second response web page. This extracted information is deemed to be the pertinent information requested by the user, thereby enhancing the user's search experience by quickly filtering the response web page for the user.

BRIEF DESCRIPTION OF THE DRAWINGS

The teaching of the present invention can be readily understood by considering the following detailed description in conjunction with the accompanying drawings, in which:

FIG. 3 illustrates a second response page from a dynamic website with a form interface;

To facilitate understanding, identical reference numerals have been used, where possible, to designate identical elements that are common to the figures.

DETAILED DESCRIPTION

The present invention broadly discloses a method and apparatus for automatically detecting and extracting information from a dynamically generated website. Although the present invention is discussed below in the context of detecting and extracting information from a dynamically generated website, e.g., located at an ISP's web-server, the present invention is not so limited. Namely, the present invention can be applied in the context of improving efficiencies of search engines, forecasting, trending, market analysis, competitive analysis, etc. The present invention can also be used on a web-browser or at a business' web-server and the like. Furthermore, although the present invention is discussed below in the context of data packets available on websites, the present invention is not so limited. Namely, the present invention can be applied in the context of records, fields, forms, or any other unit or measure of data. For the purpose of scope, the term packet is intended to broadly include a record or a field.

Figure 1:
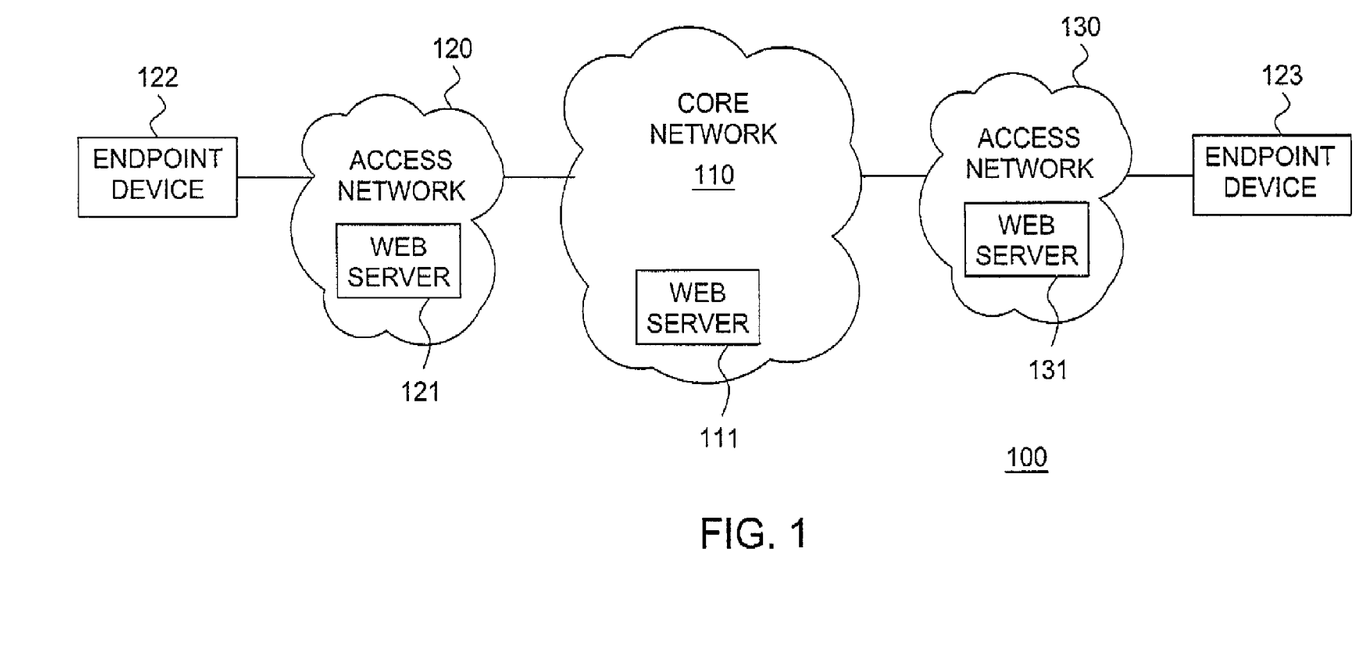
FIG. 1 illustrates an exemplary network related to the present invention.

To better understand the present invention, FIG. 1 illustrates an example network 100, e.g., a packet network such as an IP network related to the present invention. The IP network may comprise various types of customer endpoint devices connected via various types of access networks to a carrier (e.g., a service provider) IP core infrastructure over an Internet Protocol (IP) based core backbone network. Broadly defined, an IP network is broadly defined as a network that uses Internet Protocol to exchange data packets.

The customer endpoint devices 122 can be either Time Division Multiplexing (TDM) based or IP based. TDM based customer endpoint devices may comprise TDM phones or Private Branch Exchange (PBX). IP based customer endpoint devices may comprise IP phones or PBX. Furthermore, customer endpoint devices 122 may comprise any computing devices, e.g., computers, laptops, personal digital assistants (PDAs), or cell phones, that may have the ability to access a web page.

The endpoint devices 122 may access a core network 110 via one or more access networks 120, e.g., a Public Switched Telephone Network (PSTN), or a Local Area Network (LAN). The access networks can be either TDM or packet based. A TDM PSTN is used to support TDM customer endpoint devices connected via traditional phone lines. A packet based access network, such as Frame Relay, ATM, Ethernet or IP, is used to support IP based customer endpoint devices via a customer LAN. A packet based access network, such as DSL or Cable, when used together with a terminal adapter (TA), can be used to support TDM based customer endpoint devices.

The core IP infrastructure 110 may be any suitable backbone network. Typically, the core IP infrastructure 110 is operated by a service provider.

Similarly, endpoint devices 123 may also access the core network 110 via one or more access networks 130, e.g., a Public Switched Telephone Network (PSTN), or a Local Area Network (LAN). Again, the access networks can be either TDM or packet based. Thus, the network 100 allows communication between endpoint devices 122 and 123.

In one embodiment, one of the endpoint devices 122 and 123 can be an application server, e.g., a web server operated by an ISP, while one of the endpoint devices 122 and 123 can be operated by a user to access one or more web pages stored on the web server. Alternatively, the web server (e.g., 111, 121, or 131) can be deployed in one of the access networks 120 and 130 or in the core network 110. For example, the web server can be deployed by a business, e.g., an enterprise customer of a service provider of the core network.

The above IP network 100 is described to provide an illustrative environment in which packets may traverse throughout the entire network. Many large businesses may maintain a significant presence on the internet. A corporate website is often designed and developed based on a thorough analysis of the market needs, competitive landscape and functional requirements. In general, corporate websites may have informative web content, a good navigation flow and customer-centered interactive applications (e.g., forms to be filled by visitors). A visitor or a user with a computer at a location may access the corporate website via the LAN 120 and IP network 110. The information to be extracted may reside at the corporation's host routers. Typically, the visitor then enters some information on a form and receives a response from the corporation's website.

Figure 2:
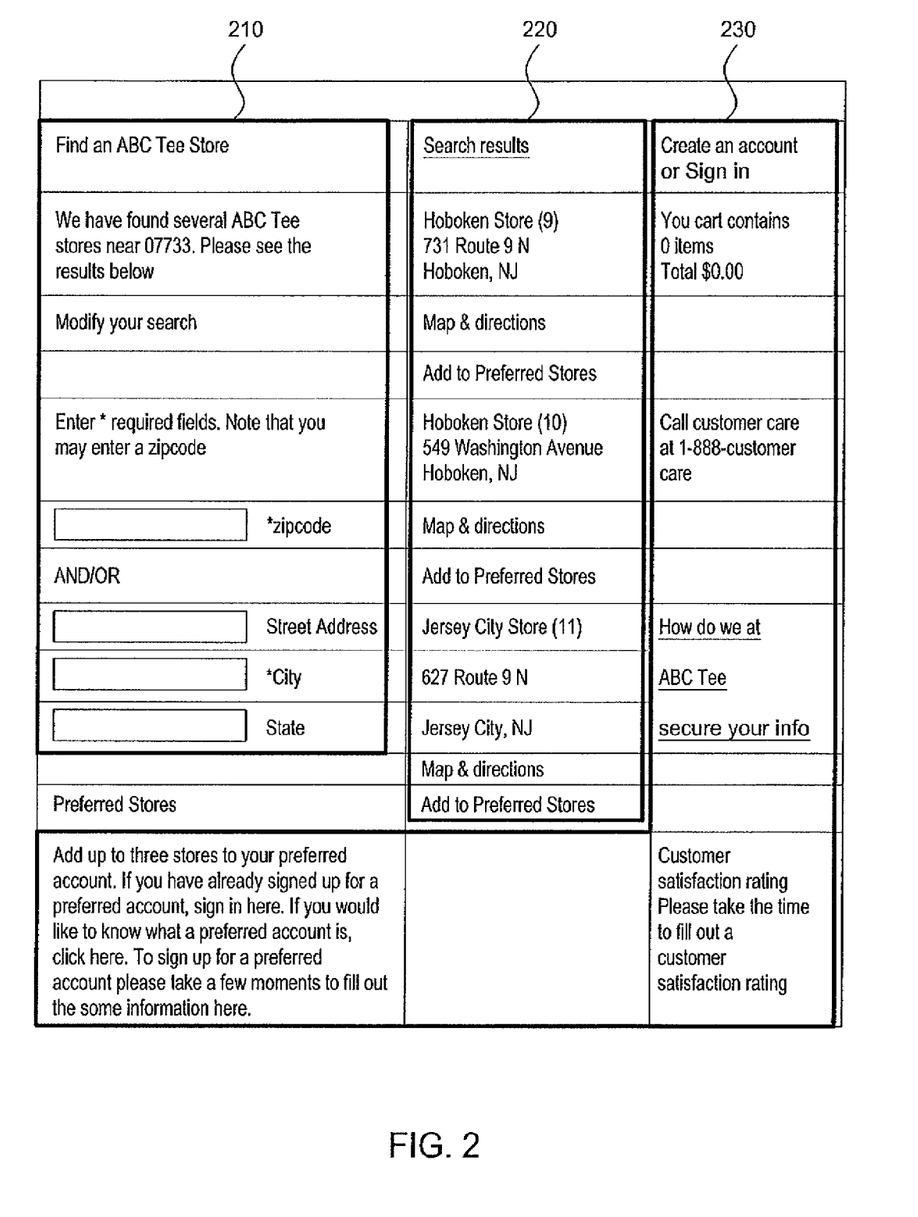
FIG. 2 illustrates a first response page from a dynamic website with a form interface with user input.

FIG. 2 illustrates a sample response form from a business website with information entered by a user. In this illustrative example, the business is named ABC Tee and the customer is requesting the location of stores near the zip code 07733. In web page structure 210, the form allows the user to enter the address and/or zip code information for locating a desired store. Some forms may ask for a telephone number to help locate the store as well. The software associated with the form utilizes the information entered by the user to determine those stores that are closest to the address or zip code entered by the user. Some forms may give the user an option to enter the radius within which to narrow the search and so on.

In this illustrative example, the information requested by the user is provided in web page structure 220. This web page provides the user with three addresses that fit the criteria provided by the user. The results also provide the user the option to get directions to and from the store.

In this illustrative example, Web page structure 230 provides extraneous information not requested by the user. This may include an option for the user to open a user account, shopping cart information, customer care information and customer feedback information. Web page structure 230 may also include advertisements from the business, contact information, links to other sites, Frequently Asked Questions (FAQ), etc. The current invention provides a method for detecting and extracting information from a dynamically changing website.

A customer wishing to use ABC Tee's website recognizes that the response from this dynamic web page contains information that was not requested nor desired. In some instances, the amount of un-requested information may comprise a substantial portion of the displayed information on a web page. This leads to a degraded experience for the user since the user must peruse through the entire web page to acquire the pertinent portion of the information that the user is seeking. In some instances, a web page may present "blocking" advertisements that will temporally appear and occlude the desired information, thereby requiring a user to view an advertisement. Thus, a customer may wish to buy a product or to subscribe to a service from a service provider (e.g., a network service provider or an Internet Service Provider (ISP)) that will assist in reducing the excess information provided on a web page.

In one embodiment of the current invention, a service provider may use the present method to improve a customer's browsing experience on the business website. In one embodiment, the present method has access to the customer's input and the response page of FIG. 2, where the response page is subsequently stored for further processing. The method then applies an input (e.g., an arbitrary input or a default input) that is similar to the customer's input (e.g., another zip code in this example) to the form on the web page. The resulting second response page is also stored and analyzed.

In one embodiment, the present invention compares the first response web page with the second response web page to determine a difference between the two response pages. For example, the present invention will be able to determine that the information located in web page structures 220 and 320 contain different information, whereas web page structures 230 and 330 contain the same information. As such, the present method may deduce that the information in web page structures 230 and 330 will likely contain un-requested or undesirable information, whereas web page structures 220 and 230 will likely contain requested or desired information. The reasoning behind this approach is the presumption that static information between the two response web pages will likely contain un-requested information, i.e., information that will be presented irrespective of the user information this is entered into a form of web structures 210 and 310. Such information will likely be advertisements and similar undesired information.

In one embodiment, the present invention compares the first response web page with the second response web page to determine a difference between the two response pages. For example, the present invention will be able to determine that the information located in web page structures 220 and 230 contain different information, whereas web page structures 230 and 330 contain the same information. As such, the present method may deduce that the information in web page structures 230 and 330 will likely contain un-requested or undesirable information, whereas web page structures 220 and 230 will likely contain requested or desired information.

The reasoning behind this approach is the presumption that static information between the two response web pages will likely contain un-requested information, i.e., information that will be presented irrespective of the user information this is entered into a form of web structures 210 and 310. Such information will likely be advertisements and similar undesired information.

In contrast, dissimilar information, e.g., dynamically changing information between the two response web pages will likely contain requested information, i.e., information that will be presented directly in response to the particular user information this is entered into a form of web structures 210 and 310. As such, the present method will then be able to deduce that the information in web structure 220 will likely contain the information requested by the user. In one embodiment, the present method will only present this web structure 220 to the user for review.

As such, a service provider may use the present method to improve the browsing experience of its customers by exploiting the similarity in the web structures of the response web pages shown in FIG. 2 and FIG. 3 to extract the appropriate information for the customer. In one embodiment, the customer may then receive a modified version of the form interface presented in FIG. 2 without the extraneous information.

In one embodiment, the present invention may use the knowledge of the similar information and the dissimilar information to optionally deduce the underlying template (e.g., the number of fields, the type of fields, the number of characters needed for each field, and so on) that is common between the web pages generated by the same on-line application. Namely, the present invention may understand the forms of the web pages (e.g., parameters, logics, parameter-value pair and the like). Detecting the underlying template will improve the ability to refine the inputs that will be lead to the best information that can be extracted from the on-line application.

For example, detecting the parameter "zip code" will allow the present invention to select five (5) numeric values to be entered as an input for this parameter. Similarly, detecting the parameter "phone number" will allow the present invention to select ten (10) numeric values to be entered as an input for this parameter. As such, over time, the present invention may deduce a plurality of parameter and value pairs. In other words, the second query will be generated using information that is similar in form or structure to the user provided information but is different in content when compared to a first query.

It should be noted that although the above example only discloses using two response web pages, the present invention is not so limited. Namely, any number of response web pages can be used to produce the extracted information, e.g., using multiple response web pages may produce amore accurate result.

It should be noted that although the above example discloses that a second query is generated after a first query is submitted, the present invention is not so limited. In one embodiment, the present method may have already previously provided a query to the online application and one or more response web pages have already be received and stored. Thus, the present invention is not limited by the time frame as to when this "second" query is generated and submitted to the on-line application.

It should be noted that the user information received by the form portion of the web page is not limited to the entry of text information. Namely, different modalities of input can be deployed (e.g., speech, text, handwriting and so on). In fact, the entered input can be extracted from a natural language speech.

Figure 4:
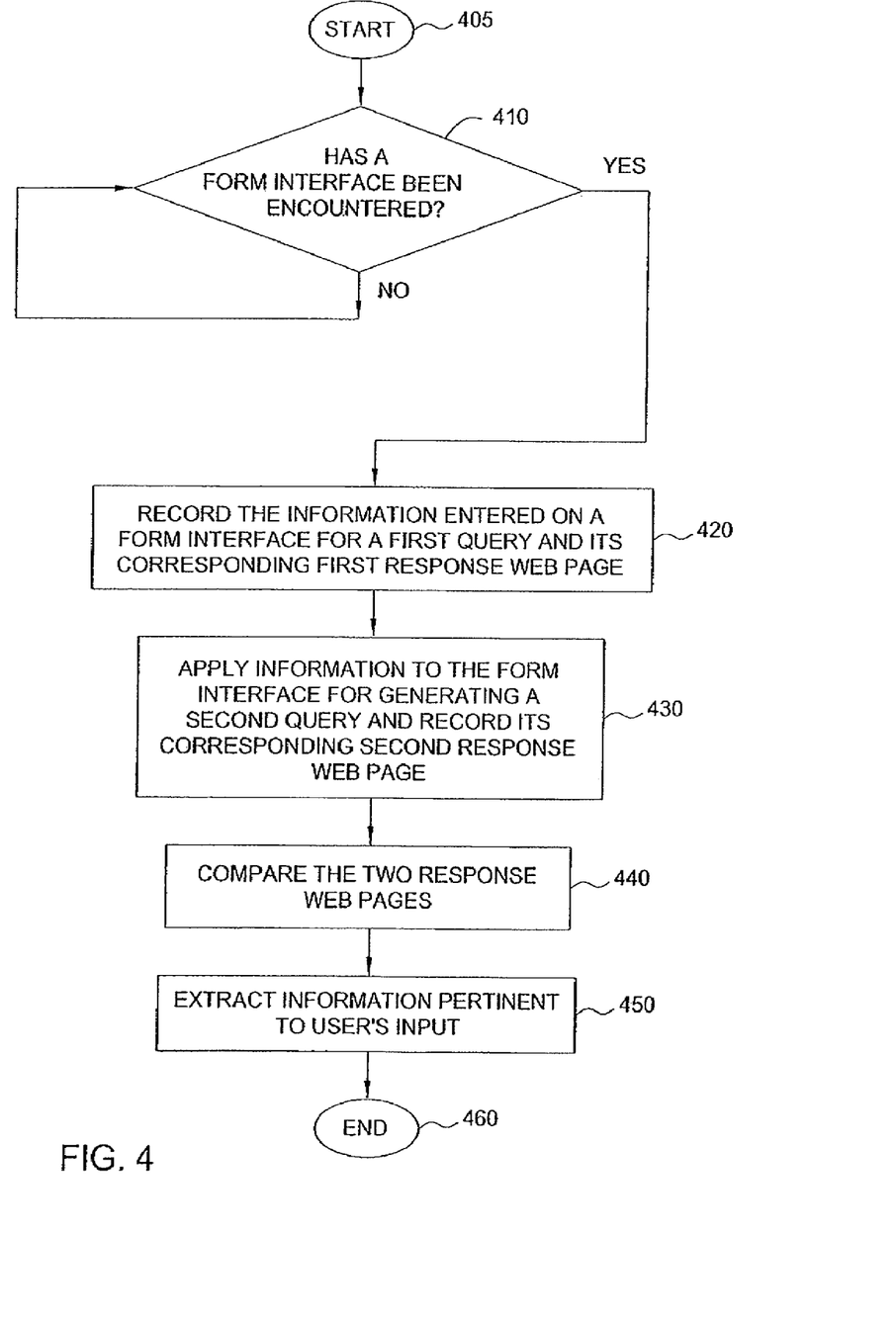
FIG. 4 illustrates a flowchart of a method for automatically detecting and extracting information from a dynamically generated website.

FIG. 4 illustrates a flowchart of a method 400 for automatically detecting and extracting information from a dynamically generated web-site. Method 400 starts in step 405 and proceeds to step 410.

In step 410, method 400 queries whether a form interface has been encountered. In one embodiment, a customer may access one or more websites to search for pertinent information. For example, the customer may enter information into a search engine and retrieves a list of locations or items that are similar to the information being searched. In one embodiment, method 400 continues to monitor the various sites accessed by the customer to determine whether a form interface has been encountered. If no form interface has been encountered, method 400 returns to step 410 and continues to monitor the customer's search progress. If a form interface has been encountered, method 400 proceeds to step 420. In other words, until the customer makes a query on a website via a form interface, method 400 ignores the sites searched by the customer.

In step 420, method 400 records the information entered by the user on a form interface of a web page. Namely, the information entered by a user that is necessary for a query (e.g., a first query) to be launched is collected and stored. Furthermore, a response web page (e.g., a first response web page) to the query is also stored. It should be noted that the first query is triggered by a user.

In step 430, method 400 applies information (e.g., default or arbitrary information) to the form interface that will be needed to generate a second query. Similarly, a second response web page to the second query is also stored. For example, if the user entered a zip code or a phone number in a form interface to start a first search, then method 400 will apply a default or arbitrary zip code or a phone number to start a second search. As such, the second query is not triggered by the user, but instead is automatically generated and triggered by the present method. In one embodiment, method 400 will track the type of information will be needed to trigger a query so that it will be able to apply the proper information to trigger a second query in step 430. In one embodiment, the default or arbitrary information can simply be information that is different by one or more alphanumeric characters as previous entered by the user. For example, if the user entered zip code 07702 in a first query, then the method may enter zip code 07802 in a second query and so on.

In step 440, method 400 compares the two response web pages to determine their differences and/or similarities. As discussed above, in one embodiment, it is presumed that similarities between the two response web pages will likely be un-requested information, whereas differences between the two response web pages will likely be requested information. In other words, the similarities in the two web pages will likely be extraneous pieces of information that are to be discarded.

In step 450, method 400 will extract the requested information to be presented to the user. In one embodiment, information located in the first response web page that has changed when compared to the second response web page will be deemed to be pertinent information requested by the user. This information is then provided to the user. As a result, method 400 is capable of filtering out the extraneous information and provides the user only with the pertinent information. Method 400 ends in step 460.

It should be noted that although the present invention is disclosed above in terms of a user seeking information from a website, the present invention is not so limited. For example, the present invention can be implemented to automatically gather information into a database. In other words, the present invention can be used for web mining, knowledge base building and the like. In yet another example, the present invention can be implemented in a customer care dialog system. For example, the present invention can be implemented to assist a service agent to concisely answer customer requests using the extracted information.

Figure 5:
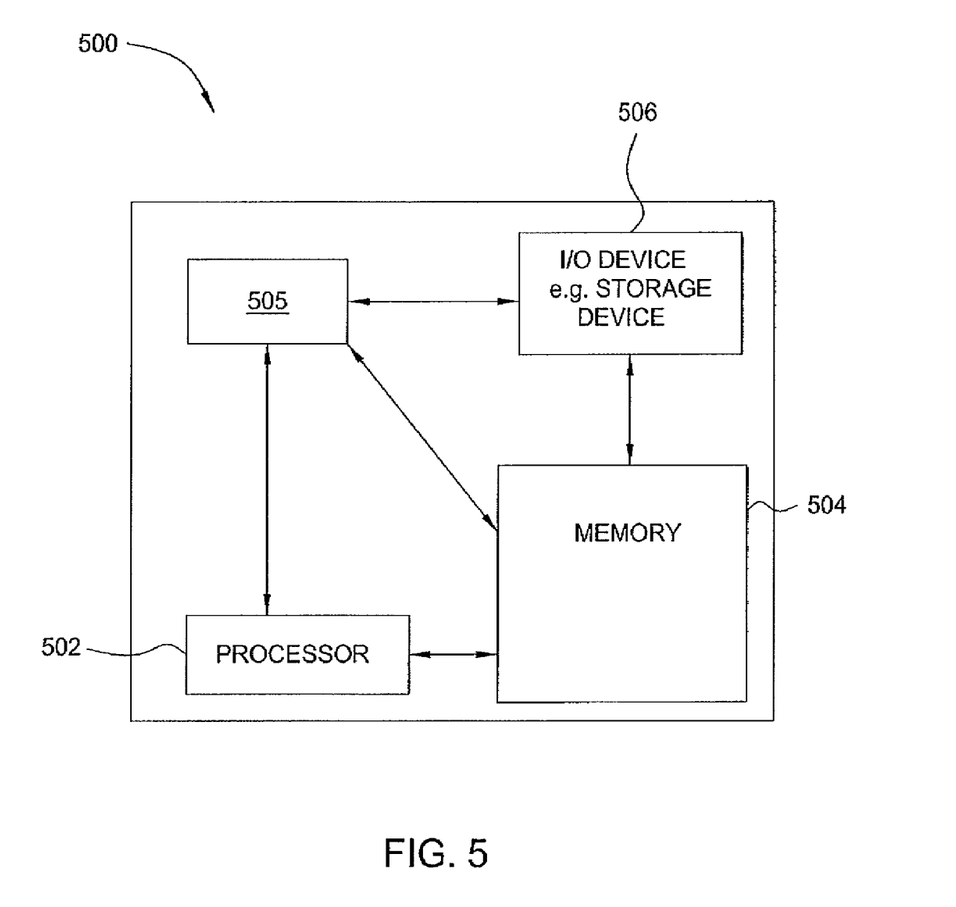
FIG. 5. illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for detecting and extracting information from a dynamically generated website, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for detecting and extracting information from a dynamically generated website can be loaded into memory 504 and executed by processor 502 to implement the functions as discussed above. As such, the present method 505 (including associated data structures) for detecting and extracting information from a dynamically generated website of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A method for extracting information from a website, comprising:
   storing a first response web page that is responsive to a first query on a web page, where the first query is generated using user provided information;
   detecting a template of the web page having a parameter and value pair;
   storing a second response web page that is responsive to a second query on the web page initiated by a server of a service provider, wherein the second query is generated in accordance with arbitrarily chosen information entered for the parameter and value pair of the web page that is similar in form to the user provided information, wherein the arbitrarily chosen information is different from the user provided information;
   comparing, via a processor, the first response web page and the second response web page; and
   extracting information that is dissimilar between the first response web page and the second response web page.

2. The method of claim 1, wherein the first query is triggered by a user.

3. The method of claim 2, wherein the second query is triggered automatically.

4. The method of claim 1, wherein the extracting information comprises extracting information from the first response web page that is dissimilar between the first response web page and the second response web page.

5. The method of claim 1, wherein the first response web page and the second response web page are stored on a server.

6. The method of claim 4, further comprising:
   presenting only the information that is extracted as requested information responsive to the first query.

7. The method of claim 1, wherein the extracting information from the website is provided as a service by a service provider.

8. A computer-readable storage medium having stored thereon a plurality of instructions, the plurality of instructions including instructions which, when executed by a processor, cause the processor to perform a method for extracting information from a website, comprising:
   storing a first response web page that is responsive to a first query on a web page, where the first query is generated using user provided information;
   detecting a template of the web page having a parameter and value pair;
   storing a second response web page that is responsive to a second query on the web page initiated by a server of a service provider, wherein the second query is generated in accordance with arbitrarily chosen information entered for the parameter and value pair of the web page that is similar in form to the user provided information, wherein the arbitrarily chosen information is different from the user provided information;
   comparing, via a processor, the first response web page and the second response web page; and
   extracting information that is dissimilar between the first response web page and the second response web page.

9. The computer-readable storage medium of claim 8, wherein the first query is triggered by a user.

10. The computer-readable storage medium of claim 9, wherein the second query is triggered automatically.

11. The computer-readable storage medium of claim 8, wherein the extracting information comprises extracting information from the first response web page that is dissimilar between the first response web page and the second response web page.

12. The computer-readable storage medium of claim 8, wherein the first response web page and the second response web page are stored on a server.

13. The computer-readable storage medium of claim 11, further comprising:
    presenting only the information that is extracted as requested information responsive to the first query.

14. The computer-readable storage medium of claim 8, wherein the extracting information from the website is provided as a service by a service provider.

15. An apparatus for extracting information from a website, comprising:
    a processor, configured to:
      store a first response web page that is responsive to a first query on a web page, where the first query is generated using user provided information;
      detect a template of the web page having a parameter and value pair;
      store a second response web page that is responsive to a second query on the web page initiated by a server of a service provider, wherein the second query is generated in accordance with arbitrarily chosen information entered for the parameter and value pair of the web page that is similar in form to the user provided information, wherein the arbitrarily chosen information is different from the user provided information;
compare the first response web page and the second response web page; and
extract information that is dissimilar between the first response web page and the second response web page.

16. The apparatus of claim 15, wherein the first query is triggered by a user.

17. The apparatus of claim 16, wherein the second query is triggered automatically.

18. The apparatus of claim 15, wherein the processor is configured to extract the information by extracting the information from the first response web page that is dissimilar between the first response web page and the second response web page.

19. The apparatus of claim 18, wherein the processor is further configured to:
present only the information that is extracted as requested information responsive to the first query.

20. The apparatus of claim 15, wherein the extracting information from the website is provided as a service by a service provider.

* * * * *